United States Patent
Huang et al.

(10) Patent No.: US 6,786,636 B1
(45) Date of Patent: Sep. 7, 2004

(54) MECHANISM FOR REMOVING PROBE COVER FROM A THERMOMETER PROBE

(75) Inventors: Hung-Tsan Huang, Hsinchu (TW); Min-Teng Chu, Hsinchu (TW); Howard Lin, Hsinchu (TW)

(73) Assignee: Norm Pacific Automation Corp., Hsinchu (TW)

( * ) Notice: Subject to any disclaimer, the term of this patent is extended or adjusted under 35 U.S.C. 154(b) by 0 days.

(21) Appl. No.: 10/619,002

(22) Filed: Jul. 15, 2003

(51) Int. Cl.⁷ .................. G01K 1/008; A61B 1/227
(52) U.S. Cl. ............................... 374/158; 600/474
(58) Field of Search ..................... 374/158, 209; 600/474, 549, 559, 184; 206/306

(56) References Cited

U.S. PATENT DOCUMENTS

| | | | | |
|---|---|---|---|---|
| 3,738,479 A | * | 6/1973 | Sato | 374/209 |
| 3,905,232 A | * | 9/1975 | Knute | 374/158 |
| 3,929,018 A | * | 12/1975 | Turner | 374/158 |
| 3,999,434 A | * | 12/1976 | Yen | 374/158 |
| 4,112,762 A | * | 9/1978 | Turner et al. | 206/306 |
| 4,159,766 A | * | 7/1979 | Kluge | 374/209 |
| 4,588,306 A | * | 5/1986 | Burger et al. | 374/158 |
| 4,863,281 A | * | 9/1989 | Suszynski | 374/158 |
| 5,340,215 A | * | 8/1994 | Makita et al. | 374/121 |
| 5,411,032 A | * | 5/1995 | Esseff et al. | 600/549 |
| 6,367,973 B2 | * | 4/2002 | Yamaka | 374/158 |
| 2003/0067958 A1 | * | 4/2003 | Jang | 374/158 |

* cited by examiner

Primary Examiner—Diego Gutierrez
Assistant Examiner—Stanley J. Pruchnic, Jr.
(74) Attorney, Agent, or Firm—Rabin & Berdo, P.C.

(57) ABSTRACT

A mechanism for removing probe covers from an ear thermometer includes a fastening portion, a connecting portion and a pushing portion. The fastening portion is mounted to the thermometer at a portion near the measuring probe. The connecting portion has one end connected to the fastening portion and the other end connected to the pushing portion. The pushing portion is located at rear end of the probe cover so that as the connecting portion or the pushing portion being pressed by user, the probe cover is removed from the probe.

10 Claims, 6 Drawing Sheets

MECHANISM FOR REMOVING PROBE COVER FROM A THERMOMETER PROBE

BACKGROUND OF THE INVENTION

1. Field of the Invention

The invention relates to a mechanism applicable to an ear thermometer or the like for removing probe covers from the probe of the thermometer.

2. Related Art

Ear thermometers are taking place of conventional thermometers in taking body temperatures from ear canals instead of taking temperatures from mouth, axilla and recta. Ear thermometer is fast, safe, convenient and causes less interference or embarrassing to the person being measured. For patients or ill people lying in bed, ear thermometer is also an easier and safer tool for taking temperatures. Since ear thermometers take less contact to the users, and disposable probe covers can be used, the possibility of disease infection through contacts is also reduced.

Recently, SARS infections attack some Asian countries and arouse people taking actions to prevent disease spread. Since fever is a symptom of SARS, many families and organizations prepare ear thermometers as a first referenced tool for screening possible infected persons.

Using ear thermometers without carefully applying probe covers could also cause disease spread. For example, after taking one's temperature, removing the used probe cover with hand could contaminate the fingers and next probe covers. Especially in public use, ear thermometer with suitable probe cover removing mechanism is a better way to prevent contamination and keep measurements accurate.

Unfortunately, general ear thermometers do not include mechanisms for removing used probe covers. Rarely a specific product has its specific way to eject probe covers, but the mechanism requires a lever and handle pivoted on the thermometer and specific probe covers having mounting portions to be fastened to the probe. Therefore, it is desired to have a simpler mechanism, especially can be an attachment, applicable to general ear thermometers for removing common probe covers without limitations of the thermometers or probe covers.

SUMMARY OF THE INVENTION

The object of the invention is to provide a mechanism for removing probe covers from an ear thermometer. The mechanism has simple structure easy to be mounted and used with a general ear thermometer, and easy to be removed and replaced.

A mechanism for removing probe covers from an ear thermometer according to the invention includes a fastening portion, a connecting portion and a pushing portion. The fastening portion is mounted to the thermometer at a portion near the measuring probe. The connecting portion has one end connected to the fastening portion and the other end connected to the pushing portion. The pushing portion is located at rear end of the probe cover so that as the connecting portion or the pushing portion being pressed by user, the probe cover is removed from the probe. The fastening portion can be a ring attached to the rear end of the probe or any suitable form fixed or adhered to the thermometer so as to be easily removed or replaced.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

Figure 1:
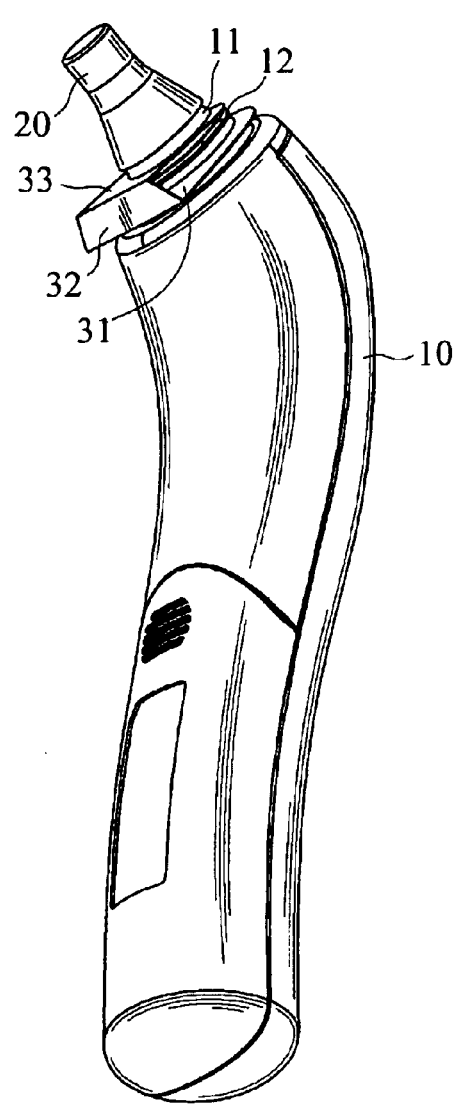
FIG. 1 is a structural view of a first embodiment of the invention.

As shown in FIG. 1, a first embodiment of the invention includes a fastening portion 31, a connecting portion 32 and a pushing portion 33 to be mounted on a probe 11 of an ear thermometer 10 for removing a probe cover 20 from the probe 11. The mechanism is made with a film or thin plate. The fastening portion 31 is a ring to be fixed to the rear end of the probe 11 with adhesive or by the aid of an extrusion 12 formed on the rear end of the probe 11. The connecting portion 32 is a U-shape structure having one end connecting to the fastening portion 31 and the other end connecting to the pushing portion 33. The pushing portion 33 is also a ring located at rear end of the probe 20.

Figure 2:
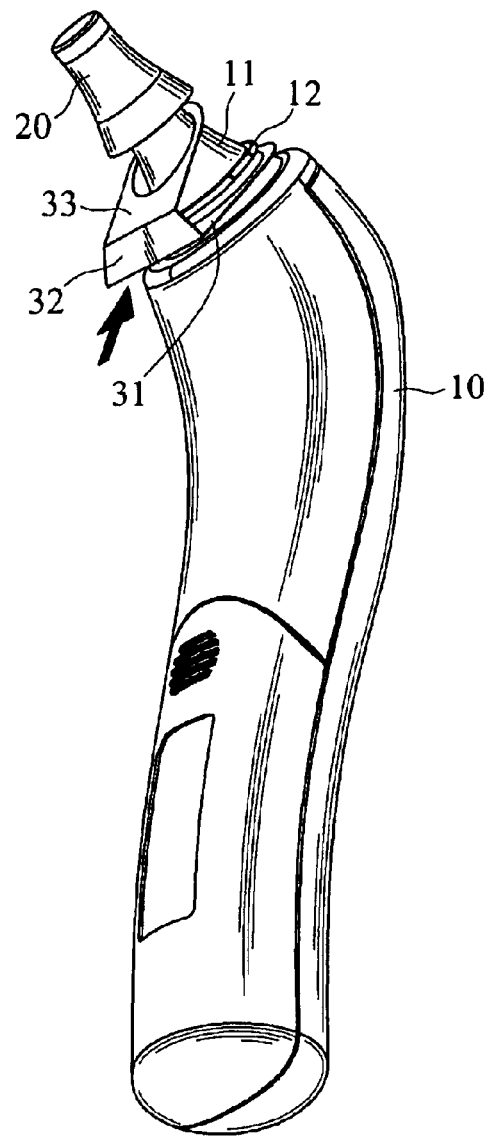
FIG. 2 is a functional view of the first embodiment of the invention.

When using, as shown in FIG. 2, push the connecting portion 32 at the rim of the pushing portion 33. Since the fastening portion 31 is fixed to the rear end of the probe 11, the pushing portion 33 is then moved forward along the probe 11 and pushes the rear end of the probe cover 20 and releases the probe cover 20 from the probe 11. Because the mechanism is an attachment to the probe 11, it can be easily removed or replaced if being unused or damaged.

Figure 3:
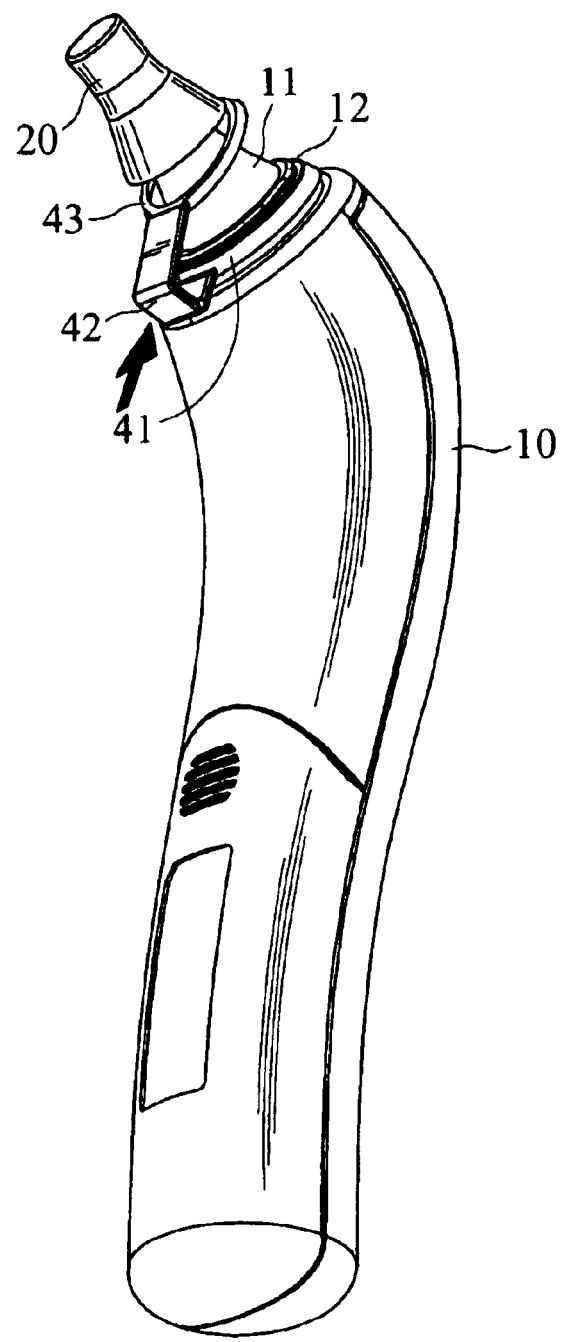
FIG. 3 is a functional view of a second embodiment of the invention.
Figure 4A:
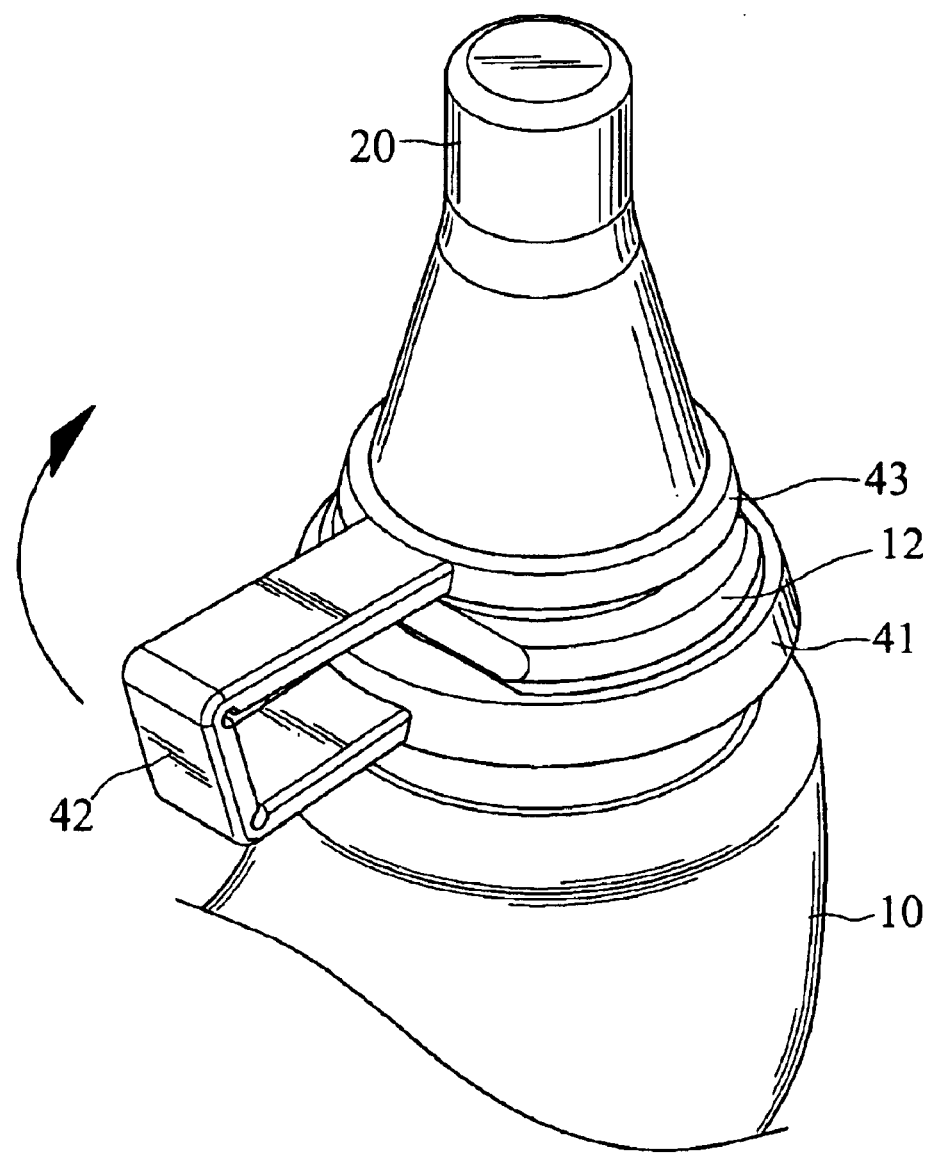
FIGS. 4A and 4B are detailed views of the fastening portion in the second embodiment of the invention.
Figure 4B:
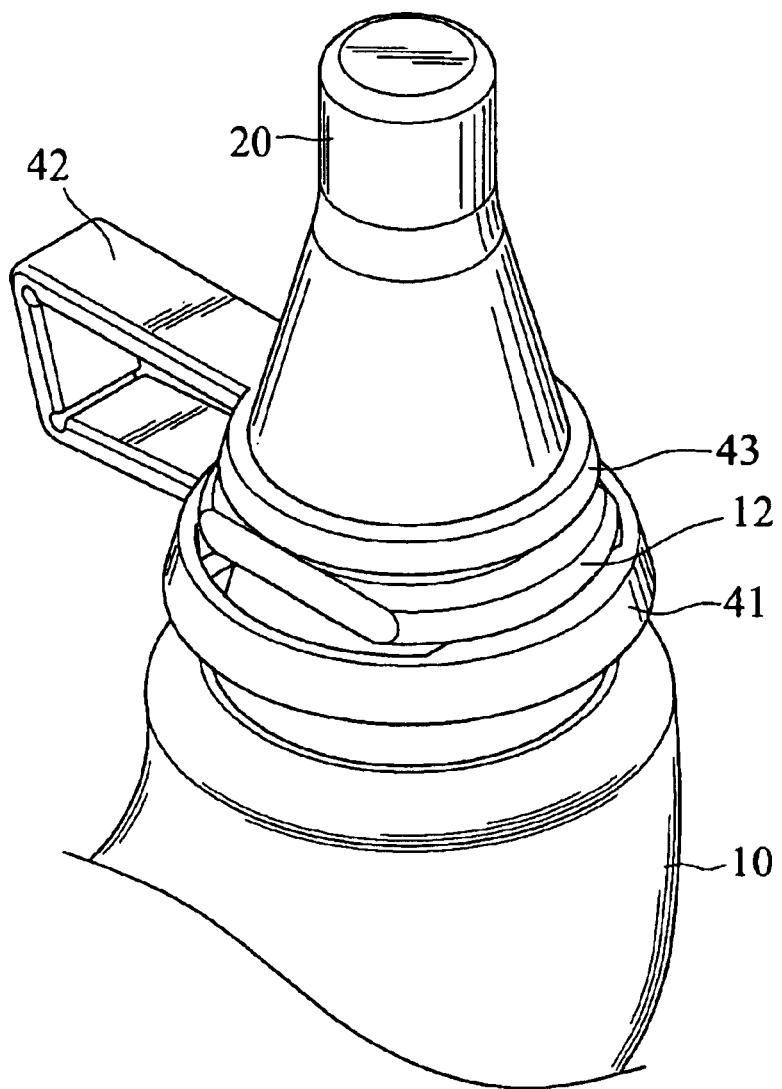

FIG. 3 is a second embodiment of the invention applied to an ear thermometer 10. The structure of the mechanism is now thicker for better stiffness. It is also composed of a fastening portion 41, a connecting portion 42 and a pushing portion 43. As shown in FIGS. 4A and 4B, the fastening portion is a ring having two inward fillings corresponding to two cutoffs on the flange 12 formed near the rear end of the probe 11. Therefore, the fastening portion 41 can be placed in and rotated with an angle so as to be seized by the flange 12 and prevented from loose. The connecting portion 42 is formed with three foldable plates and having two flexible hinge portions to allow the pushing portion 43 moved relatively to the fixing portion 41 upon being pressed by user at the connecting portion 42.

Figure 5:
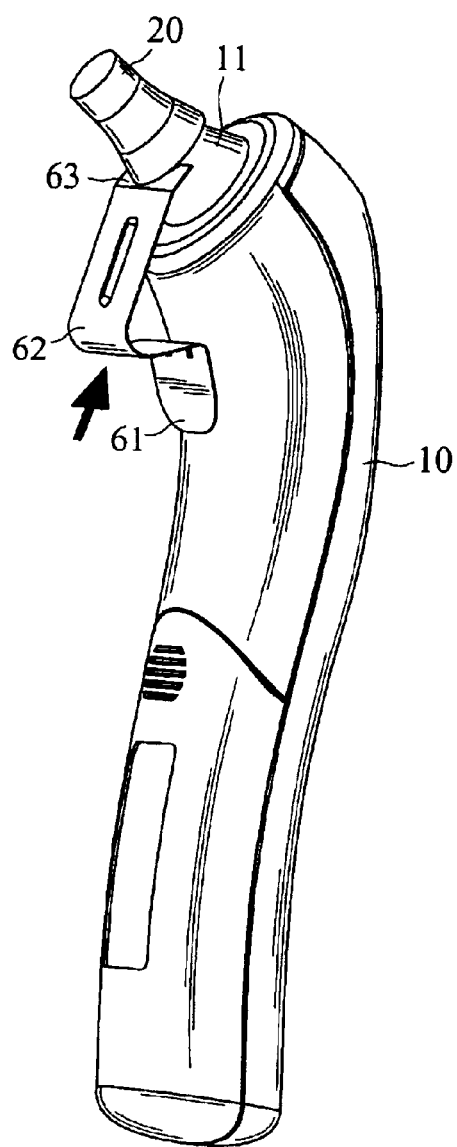
FIG. 5 is a functional view of a third embodiment of the invention.

FIG. 5 shows a third embodiment of the invention. The mechanism is also composed of a fastening portion 61, a connecting portion 62 and a pushing portion 63. The fastening portion 61 is fixed with adhesive to the thermometer 10 at a position near the probe 11. The connecting portion 62 is an outward bending for user to press. The pushing portion 63 is a fork touching a part of rear end of the probe cover 20. Since the fastening portion 61 is fixed, when the connecting portion 62 is pressed, the pushing portion 63 is then moved forward to push the probe cover 20 released from the probe 11.

Figure 6:
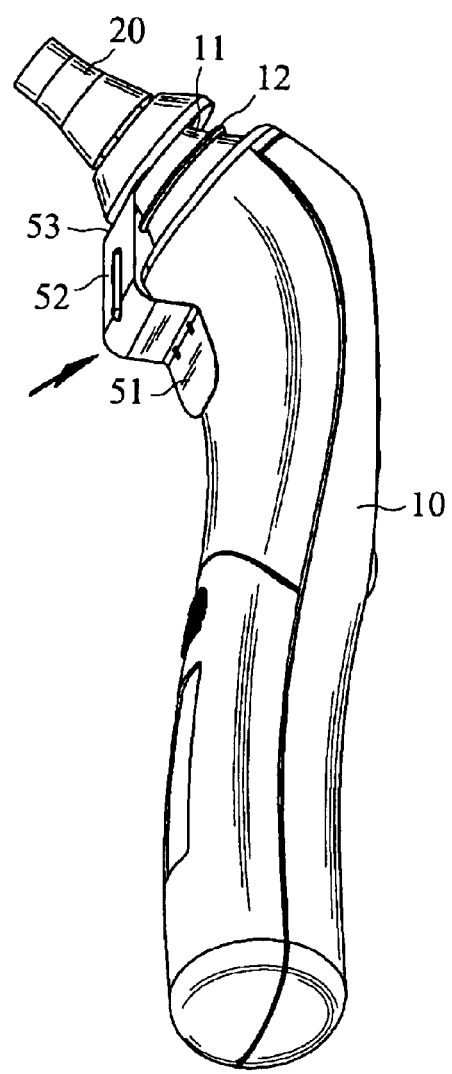
FIG. 6 is a functional view of a fourth embodiment of the invention.

Similarly, in FIG. 6, a fourth embodiment of the invention, the mechanism is also composed of a fastening portion 51, a connecting portion 52 and a pushing portion 53. The fastening portion 51 and the connecting portion 52 are the same as that of FIG. 5, but the pushing portion 53 is a ring to touch the rear end of the probe cover 20. The function of the mechanism is just the same as that of the third embodiment. This kind of structure is very simple and easy to make.

Figure 7:
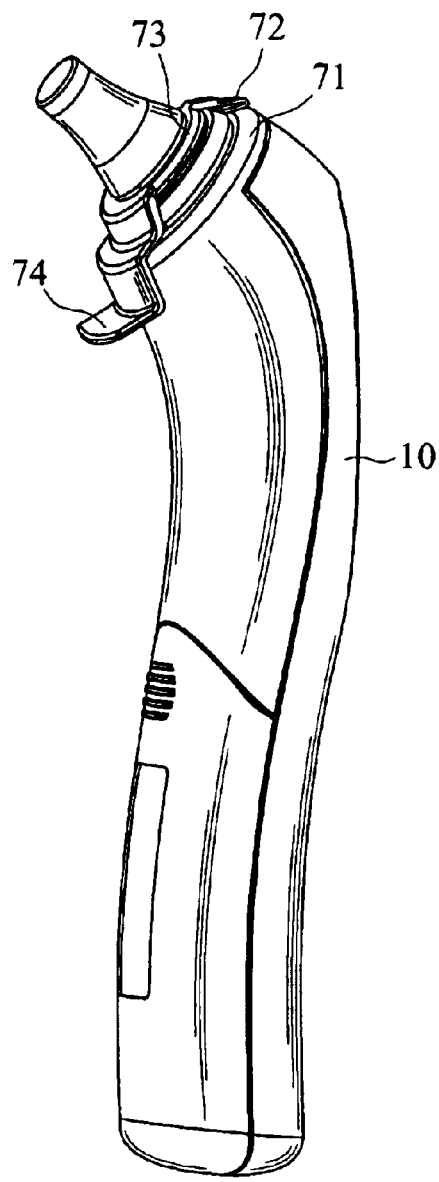
FIGS. 7 and 8 are structural and functional views of a fifth embodiment of the invention.
Figure 8:
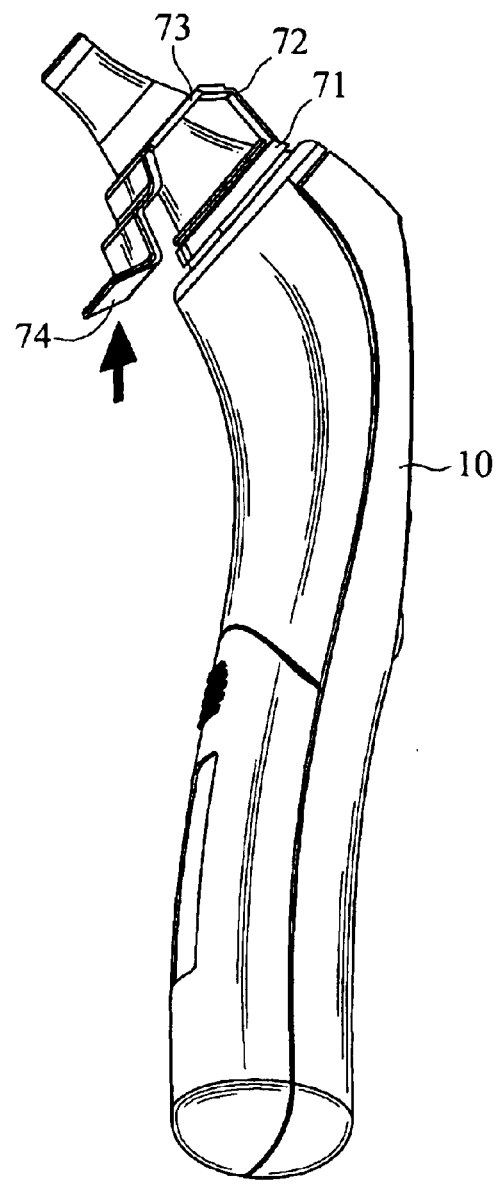

FIGS. 7 and 8 illustrate a fifth embodiment of the invention. Similar to the second embodiment, the mechanism is composed of a fastening portion 71, a connecting portion 72 and a pushing portion 73. The connecting portion 72 is flexible to let the pushing portion 73 movable along the probe 11. As a probe cover 20 being mounted on the probe 11, the rear end of the probe cover 20 pushes the pushing portion 73 backward as shown in FIG. 7. The rim of the pushing portion 73 is formed with an extension 74 for user to push the pushing portion 73 forward when the probe cover 20 is to be removed as shown in FIG. 8.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mechanism, applicable to an ear thermometer, for removing a probe cover mounted on a probe of the thermometer, comprising:

a fastening portion, fixed to said thermometer near said probe;

a connecting portion, as a bendable structure having one end connected to said fastening portion; and a pushing portion, connected to another end of said connecting portion, and touching a rear end of said probe cover;

therefore, when said connecting portion is pressed, said pushing portion moves forward to release said probe cover from said probe.

2. A mechanism for removing probe cover from a thermometer according to claim 1 wherein said fastening portion is a ring mounted on a rear end of said probe.

3. A mechanism for removing probe cover from a thermometer according to claim 2 wherein said fastening portion is formed with inward fillings to pass through cutoffs of a flange formed on said probe, and rotated to prevent it from loosening.

4. A mechanism for removing probe cover from a thermometer according to claim 1 wherein said fastening portion is adhered to said thermometer.

5. A mechanism for removing probe cover from a thermometer according to claim 1 wherein said connecting portion is U-shaped.

6. A mechanism for removing probe cover from a thermometer according to claim 1 wherein said connecting portion bends outward to be pressed for moving said pushing portion to release said probe cover.

7. A mechanism for removing probe cover from a thermometer according to claim 1 wherein said connecting portion is formed with three foldable plates.

8. A mechanism for removing probe cover from a thermometer according to claim 1 wherein said pushing portion is a ring touching said rear end of said probe cover.

9. A mechanism for removing probe cover from a thermometer according to claim 1 wherein said pushing portion is a fork touching a part of said rear end of said probe cover.

10. A mechanism for removing probe cover from a thermometer according to claim 1 wherein said pushing portion is further formed with an extension for pushing said pushing portion forward to release said probe cover.

* * * * *